United States Patent
Narayanaswami et al.

(10) Patent No.: US 7,506,259 B1
(45) Date of Patent: Mar. 17, 2009

(54) SYSTEM AND METHOD FOR DYNAMIC MAPPING OF ABSTRACT USER INTERFACE TO A MOBILE DEVICE AT RUN TIME

(75) Inventors: Chandrasekar Narayanaswami, Wilton, CT (US); Danny Soroker, Larchmont, NY (US); Francois Huaulme, Paris (FR)

(73) Assignees: International Business Machines Corporation, Armonk, NY (US); Institute for Information Technology Advancement, Daejeon (KR)

( * ) Notice: Subject to any disclaimer, the term of this patent is extended or adjusted under 35 U.S.C. 154(b) by 0 days.

(21) Appl. No.: 12/031,386

(22) Filed: Feb. 14, 2008

(51) Int. Cl.
G06F 15/177 (2006.01)
(52) U.S. Cl. .............. 715/734; 715/735; 715/736; 715/746; 709/220
(58) Field of Classification Search ......... 715/733–747, 715/200, 201; 709/220, 223; 707/10, 101
See application file for complete search history.

(56) References Cited

U.S. PATENT DOCUMENTS

| | | | |
|---|---|---|---|
| 5,717,955 A * | 2/1998 | Swinehart | 710/62 |
| 6,073,136 A | 6/2000 | Bertram et al. | |
| 6,453,281 B1 | 9/2002 | Walters et al. | |
| 6,515,683 B1 * | 2/2003 | Wright | 715/772 |
| 6,629,183 B1 | 9/2003 | Gortz et al. | |
| 6,938,214 B2 * | 8/2005 | Proulx et al. | 715/763 |
| 6,954,755 B2 | 10/2005 | Reisman | |

(Continued)

FOREIGN PATENT DOCUMENTS

EP 1 054 318 A1 11/2000

(Continued)

OTHER PUBLICATIONS

Grundy, J., et al., "An environment for developing adaptive, multi-device interfaces," ACM International Conference Proceeding Series; vol. 36, Proceedings of the Fourth Australasian user interface conference on User interfaces 2003- vol. 18, Adelaide, Australin, pp. 47-56, Year of Publication: 2003. (Full article) http://portal.acm.org/citation.cfm?ID=820099.

(Continued)

*Primary Examiner*—Tadeese Hailu
(74) *Attorney, Agent, or Firm*—Scully, Scott, Murphy & Presser, P.C.; Lisa M. Yamonaco

(57) ABSTRACT

A system and method for enabling user preferences and device characteristics to be used to generate a customized interface for services and particularly, for enabling interaction between heterogeneous mobile devices and services in a local environment through one's device. The system automates the creation of custom mobile interfaces for service interaction, since the author of a service is typically unaware of the different types of devices that will utilize the service. The method includes communicating, when a service is invoked, the input capabilities of the device to a service broker along with preferences of the user. The characteristics and functionality of the service is included in the specification of the service. A mapping function maps the triad of user preferences, device description, and service functions to optimize the placement of the services' functions (interfaces) on to the device's input controls while taking the user preferences and device output controls into account.

2 Claims, 3 Drawing Sheets

U.S. PATENT DOCUMENTS

| | | | |
|---|---|---|---|
| 6,973,626 B1 * | 12/2005 | Lahti et al. | 715/763 |
| 7,076,738 B2 | 7/2006 | Baker et al. | |
| 7,200,651 B1 * | 4/2007 | Niemi | 709/223 |
| 2002/0069215 A1 | 6/2002 | Orbanes et al. | |
| 2002/0103668 A1 * | 8/2002 | Ecklund et al. | 705/1 |
| 2003/0117436 A1 * | 6/2003 | Kautto-Koivula et al. | 345/762 |
| 2003/0172075 A1 | 9/2003 | Reisman | |
| 2004/0235463 A1 * | 11/2004 | Patel | 455/418 |
| 2005/0086328 A1 * | 4/2005 | Landram et al. | 709/220 |
| 2005/0094179 A1 | 5/2005 | Freeny et al. | |
| 2005/0132305 A1 | 6/2005 | Guichard et al. | |
| 2005/0204310 A1 * | 9/2005 | De Zwart et al. | 715/821 |
| 2005/0260996 A1 * | 11/2005 | van de Groenendaal | 455/445 |
| 2006/0053379 A1 | 3/2006 | Henderson et al. | |
| 2006/0112063 A1 | 5/2006 | Agapi et al. | |
| 2006/0168388 A1 | 7/2006 | von Tetzchner | |
| 2007/0006100 A1 | 1/2007 | Roto et al. | |
| 2007/0043608 A1 | 2/2007 | May et al. | |
| 2007/0061331 A1 | 3/2007 | Ramer et al. | |
| 2007/0206221 A1 | 9/2007 | Wyler et al. | |
| 2007/0234223 A1 | 10/2007 | Leavitt et al. | |
| 2008/0016187 A1 * | 1/2008 | Neil et al. | 709/220 |
| 2008/0134045 A1 * | 6/2008 | Fridman et al. | 715/735 |

FOREIGN PATENT DOCUMENTS

| | | |
|---|---|---|
| WO | WO 03/048949 A1 | 6/2003 |
| WO | WO 2004/107104 A2 | 12/2004 |

OTHER PUBLICATIONS

Nilsson, E.G., et al., "Model-based user interface adaptation," SINTEF, Trondheim, Norway, Computers & Graphics, vol. 30, No. 5, p. 692-701. Published: Elsevier, Oct. 2006. INSPEC, © 2007 Institution of Electrical Engineers. Dialog® File No. 2 Accession No. 10212151.

Krebs, A.N., et al.,"Adaptive applications for ubiquitous collaboration in mobile environments," System Sciences, 2004. Proceedings of the 37th Annunl Hawaii International Conference, Publication Date: Jan. 5-8, 2004, pp. 10 pp., Number of pp. lxxi+320, INSPEC Accession No. 8883193, Digital Object Identifier: 10.1109/HICSS.2004.1265097, Posted online; Feb. 26, 2004 10:51:31.0 http://ieeexplore.ieee.org/search/srchabstract.jsp?arnumber=1265097&isnumber=28293&punumber=8934&k2dockey=1265097@ieeecnfs&query=%28+%28+interface%3Cin%3Emetadata+%29+%3Cand%3E+%28+adaptive %3Clin%3Emetadata+%29+29¹¹∕₃Cand%E+%28+mapping%3Clin%3Emetadata+%29&pos+4.

Dos Anjos, L.S., et al., "A Navigtion Interface for Adaptive m-Learning Applications," Advanced Learning Technologies, 2006. Sixth International Conference, Publication Date: Jul. 5-7, 2006, pp. 61-62, Posted online: Jul. 24, 2006 08:55:24.0. http://ieeexplore.ieee.org/search/srchabstract.jsp!arnumber=1652366&isnumber=34637&punumber=10997&1:2dockey=1652366@ieeecnfs&query=%28+%28+interface%3Cin%3Emetadata+%29+%3Cand%3E+%28+adaptive%3Cin%3Emetadata+%29+%29%3Cand%3E+%28+mapping%3Cin%3Emetadata+%29&pos=21, Abstract Only.

Kim, J-W., et al., "3D graphics accelerator platform for mobile devices," Field-Programmable Technology, 2004. Proceedings. 2004 IEEE International Conference, Publication Date: 2004, pp. 387-390, Number of pp. xiv+470, INSPEC Accession No. 8293064, Digital Object Identifier: 10.1109/FPT.2004.1393306, Posted online: Feb. 14, 2005 11:26:14.0. http://ieeexplore.ieee.org/search/srchabstract.jsp?arnumber=1393306&isnumber=30303&punumber=9585&k2dockey=1393306@ieeecnfs&query=%28+%28interface%3Cin%3Emetadata+%29+%3Cand%3E+%28+pda%3Cin%3Emetadata+%29+%29%3Cand%3E+%28+mapping%3Cin%3Emetadata+%29&pos=1, Abstract only.

Lamparter, S., et al., "Preference-based selection of highly configurable web services," Proceedings of the 16th international http://doi.acm.org/10.1145/1242572.1242709 http://portal.acm.org/citation.ctm?id=1242709&coll=Portal&dl=GUIDE%CFID=3204927&CFTOKEN=32633712, Abstract Only.

Oakley, I., et al., "Tilt to scroll: evaluating a motion based vibrotactile mobile interface," Conference: Proceedings. First Joint Europhaptics Conference and Symposium on Haptic Interfaces for Virtual Environment and Teleoperator Systems. World Haptics Conference, p. 40-9. Publisher: IEEE Comput. Soc, Los Alamitos, CA, USA, 2005, xvii+669 Pages. INSPEC. 2007 Institution of Electrical Engineers. Dialog® File No. 2 Accession No. 9529763, Abstract Only.

Pfletschinger, Stephen, et al., "Frequency-Selective Link Adaptation using Duo-Binary Turho Codes in OFDM Systems," Mobile and Wireless Communications Summit, 2007. 16th IST, Publication Date: Jul. 1-5, 2007, pp. 1-5, Digital Object Identifier: 10.1109/ISTMWC.2007.4299189, Posted online: Sep. 4, 2007 09:28:30.0, http://ieeexplore.ieee.org/search/srchabstract.jsp?arnumber+4299189&isnumber+4299029&punumber+4299028&k2dockey=4299189@ieeeenfs&query=%28+%28+interface%3Cin%3Emetadata+%29+%3Cand%3E+%28+adaptive%3Cin%3Emetadata+%29+%29%3Cand%3E+%28+mapping%3Cin%3Emetadata+%29&pos=16, Abstract Only.

Schindler, G., et al., "A wearable interface for topological mapping and localization in indoor environments," Conference: Location and Context-Awareness. Second International Workshop, LoCA 2006. Proceedings (Lecture Notes in Computer Science vol. 3987), p. 64-73, Publisher: Springer-Verlag, Berlin, Germany, 2006, x+288 Pages. INSPEC© 2007 Institution of Electrical Engineers. Dialog® File No. 2 Accession No. 9986270, Abstract Only.

\* cited by examiner

SYSTEM AND METHOD FOR DYNAMIC MAPPING OF ABSTRACT USER INTERFACE TO A MOBILE DEVICE AT RUN TIME

FIELD OF THE INVENTION

The present invention relates generally to service oriented architectures and web services, and more particularly, to a system and method for dynamically mapping user interfaces of a wide variety of mobile devices for ubiquitous services deployed at a service location.

BACKGROUND OF THE INVENTION

Over the recent years cellular phones, digital cameras and MP3 players have collectively outsold desktop or laptop computers by almost an order of magnitude. In some parts of the world the cellular phone is the only computing device possessed by individuals. Many phones today are multifunction devices and include digital cameras, music and video playback, several gigabytes of storage either in flash or small drives, and also short range wireless capabilities. While some include just a numeric keypad, others include full function keyboards or touch panels. In the near future mobile devices are also expected to include near field communication (NFC) tag readers and also incorporate Trusted Platform Modules (TPM). As a result mobile devices are a hotbed for deploying a wide range of services ranging from several forms of communications, web browsing and transactions to geo-tagged photography and geo-blogging. While mobile devices have the distinct advantage in number and ubiquity, they are, by their very nature, limited in size, and therefore pose a usability challenge when acting as a computing interface.

In a service oriented architecture that is deployed in public spaces, heterogeneity of services and devices is unavoidable. Late binding of the mobile device's user interface for interacting with such a service becomes important for several reasons. A device that uses the service may not have been built when the service was conceived and so the service may not know how to provide a suitable user interface on the device. In other cases, the device may not have been popular when the service was created and therefore not drawn to the attention of the service developer. In particular, a service author would not have been expected to predict the set of devices that will access the service, and a device manufacturer cannot preload interfaces for all types of services. Additionally, over the course of the deployment of the service, specific details of the service may change, thereby requiring a refinement of the interface.

There currently does not exist any efficient technology that will enable associations between services and devices for supporting effective interaction of users with services in their environment via their personal mobile devices to be created automatically without any custom programming.

In general, automatically creating such associations is difficult for a variety of reasons. First, there is a wide diversity in the types of input controls that are available on mobile devices. Some devices such as mobile phones support a set of push buttons, while other devices such as PDAs may include touch sensitive screen, devices such as Apple's iPod have a wheel that can be used to scroll through large amounts of content at variable speeds. Also the relative sizes and placements of the input controls on a particular device may be convenient to operate them in a one-handed or eyes-free manner while other devices may require a far greater level of user attention. Some devices may also support voice recognition and be able to convert voice commands into simple events that they can deliver to remote services. Given the advances in display technology, such as flexible organic LED displays, over time, it is expected that physical buttons and controls to include small displays allowing user's to change the labels on the physical controls. Such a development could reduce the reliance on a GUI on a mobile device and allow better use of the limited screen space on the device for output rather than for input widgets. As a result of the above, the set of input events that can be generated from a mobile device may be extremely varied depending on its capabilities.

Secondly there is a wide diversity in the types of environmental devices and applications or services in the environment, and each of these may support a large collection of control operations. A simple device such as a thermostat may support a few operations such setting the desired temperature and querying the current temperature. A more complex service such as purchasing a roundtrip ticket for a train journey requires a larger set of control operations.

Third, users may have their own individual preferences in terms of which control manipulations are easier for them to perform. Some users may prefer to use a rotary jog dial for scrolling operations while others may like specific push buttons to scroll up or down.

Thus, it would be highly desirable to provide a system and method that addresses the need for mobile and pervasive digital devices to generate user interfaces that take into account the user's dynamic preferences, the device's characteristics and the service's characteristics.

Moreover, it is desirable to provide a mechanism that maps a user device's interface for the service to the input controls of the device when the service is invoked. In contrast to previous models where functions are mapped to I/O devices at application creation time or application installation time, or pick a predefined mapping based on device type, it would be much more efficient and highly desirable to provide a system and method for automatically mapping the interface at service invocation time by taking into account, device characteristics, user preferences, and service characteristics.

SUMMARY OF THE INVENTION

In one aspect, the system and methodology of the invention enables services to configure user interfaces for many (mobile and pervasive) digital devices based on an abstract description of the device.

Relatedly, in one aspect, the system and methodology of the invention enables services to configure user mobile and pervasive digital devices to accommodate the user's interface-related preferences taking into account the device's size and service performance capabilities to give them easier access to services and control of devices in their environment.

In one aspect, a mobile device or pervasive digital device employs software, input controls, and display presentation capabilities for generating personalized interfaces enabling user/device interaction with ubiquitous services offered that are accessed by mobile devices, for example, at public "service zones" in a service-oriented architecture that delivers services to mobile devices in public spaces, and considering that the devices and services are continually evolving in performance, size and functional capabilities.

Thus, according to one aspect of the invention, there is provided a system and method for enabling user preferences and device characteristics to be used to generate a customized interface for services and particularly, for enabling interaction between heterogeneous mobile devices and services in a local environment through one's device. The system automates the creation of custom mobile interfaces for service interaction, since the author of a service is typically unaware of the different types of devices that will utilize the service. The method includes communicating, when a service is invoked, the input capabilities of the device to a service broker along with user preferences of the user. The characteristics and functionality of the service is included in the specification of the service. A mapping function maps the triad of user preferences, device description, and service functions to optimize the placement of the services' functions (interfaces) on to the device's input controls while taking the user preferences and device output controls into account.

More particularly, there is provided a system and method for configuring a mobile device for use in interacting with a service, the method comprising:

communicating a description of the device including one or more input control devices including one or more of: dial, knob, key, slider, bezel, switch and jog wheel devices, the device description including size, position and spacing of the input control devices;

communicating user preferences for operating the device, the preferences including one or more of: input control device size, position and spacing and preference to map actions to a particular input control device or to a group of input control devices; and, communicating a description of a service including any aspects of the service functionality, receiving, by a mapping function, the user preferences, device description, and service functions and analyzing the user preferences, device description, and service functions to create a customized mapping strategy that optimizes the placement of the service's functions on to the device's input controls while taking the user preferences into account; and, automatically configuring an interface of the mobile device based on the mapping strategy when the service is invoked, wherein the user's preference for input control size, position and spacing is taken into account with respect to a physical realization of input controls on the device.

Further to this aspect of the invention, a user preference includes one or more of: a user's physical dimensions, a user's physical location, a user's preferred handedness, a user's manual dexterity level, age, weight, gender of user, visual acuity, color perception, hearing ability; and, the device description further includes one or more of: a description of the device's output controls, device dimensions, power consumption, day/night visibility of the device input/output controls, and, a 3D geometric description of the device.

Moreover, according to the invention, a description of a service includes one or more of: a service operation, and a service name, a service description being optionally enhanced with information related to the expected use of the service, the expected use comprising one or more of: a grouping of the service operations, a frequency of service operations, an importance of service operations, a service operation hierarchy, a probability distribution of one or more operations and/or conditional probabilities of operations.

Advantageously, as a consequence, the potential of mobile devices is expanded by having better ways to provide relevant, personalized, and timely services, capturing the user's intent more effectively, and by harnessing devices and services in a local environment. Moreover, such mobile and pervasive digital devices are equipped with the ability to dynamically generate an updated interface as services evolve over time.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

The present invention provides a system and method that addresses the need for mobile and pervasive digital devices to generate user interfaces that take into account the user's dynamic preferences, the device's characteristics and characteristics of a service accessible by the devices, for example, at a service zone.

The mobile device or pervasive digital device employs software, input controls, and display presentation capabilities for generating personalized interfaces enabling user/device interaction with ubiquitous services offered that are accessed by mobile devices, for example, at public or private service zones, and considering that the devices and services are continually evolving in performance, size and functional capabilities.

Figure 1:
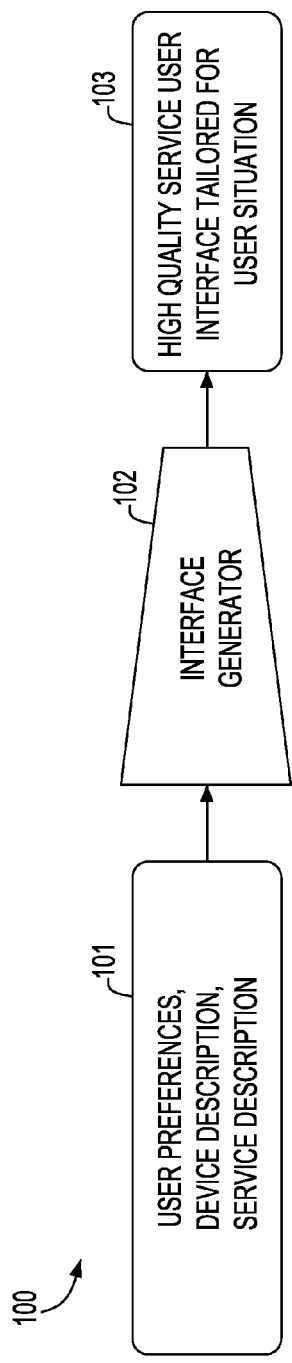
FIG. 1 is a diagram 100 depicting conceptually, the system and method of the present invention.

FIG. 1 is a diagram 100 depicting conceptually, the system and method of the present invention. Particularly, as shown in FIG. 1, a first step 101 involves the communication of user preferences, device descriptions and a service description for input to a mapping function, which generates an interface suitable for use by and tailored for the particular device accessing the service as indicated at 102. Then, as shown in FIG. 1, at step 103, the mapping function implemented generates a high-quality service user interface tailored for the user's particular situation.

Figure 2:
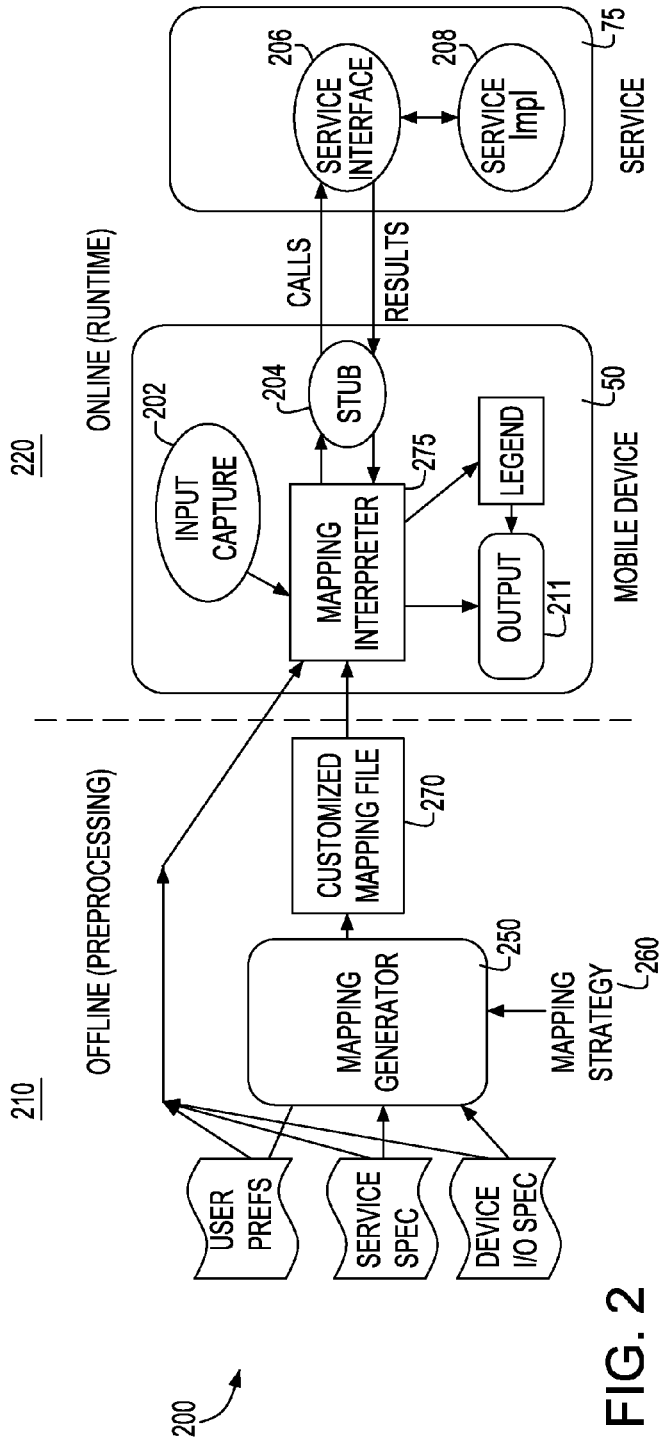
FIG. 2 describes an I/O Mapping system architecture 200 that describes the process automating the creation of a mobile user interface for interacting with a service by mapping the service requirements to the mobile device's I/O capabilities, taking into account pertinent user preferences according to one aspect of the invention.

In support of enabling effective interaction of users with services in service provider environments via their personal mobile devices, a mapping function is implemented as now described with respect to FIG. 2.

FIG. 2 describes an I/O Mapping system architecture 200 that describes the process automating the creation of a mobile user interface for interacting with a service by mapping the service requirements to the mobile device's I/O capabilities, taking into account pertinent user preferences.

As shown in FIG. 2, I/O Mapping, in one embodiment, is a two-stage process comprising: an offline stage 210 for computing a mapping between the device I/O controls and the service operations (as performed by a mapping tool); and, a runtime stage 220 where the computed mapping is employed for controlling the service via the mobile device. Thus, in one approach, the mapping is an entity that is created offline and used at runtime. There are two approaches for what the mapping can be: a compiled approach where the mapping is a compiled binary (e.g., Java bytecode), and is directly invoked at runtime; and, an interpreted approach, where the mapping is declarative (e.g., XML), and is interpreted by a general purpose runtime processor.

In the offline processing part 210, a Mapping Generator 250 is employed to receive as input specifications of the mobile device I/O capabilities, service interface and user preferences, as well as an indication of the mapping strategy 260, and generates a customized mapping file 270.

The Mapping Generator 250 particularly is the central offline component that reads the specifications of service, device and user preferences, decides on a mapping strategy, invokes a strategy-specific mapping algorithm, and produces the customized mapping file 270. Architecturally, the Mapping Generator 250 may be located on a server or like computing device or, alternatively, on the mobile device itself (if it is powerful enough, for example if it supports Java 2 Micro Edition (J2ME)). If run on the mobile device 50, mapping generation may be performed on-line. Conversely, for better online startup time and for conserving mobile device resources (memory, battery, processing), it is advantageous to perform the mapping generation ahead of time on a server.

The customized mapping file 270 declaratively encodes the generated mapping. Since different mapping strategies have different runtime characteristics, the contents of the mapping file is strategy-specific. For example, a mapping file for a GUI-based strategy would need to provide a declarative representation of the "widget" structure; whereas for a key-based strategy, the file lists a set of pages, each of which includes a list of (key, action) elements, for example, describing an geometric/ergonomic key-based mapping strategy for mapping service operations to device keys. Besides conveying the mapping, this mapping file also serves as a central point of information, and therefore it also includes references to the specifications of the device, service and user preferences.

At runtime (online), a Mapping Interpreter 275 mediates between the mobile device 50 and the service 75 by first receiving as inputs the customized mapping file 270, as well as the inputs used in the offline stage, since each of the specifications additionally contain information needed at runtime. An Input Capture module 202 captures input events on the mobile device and sends them to the Mapping Interpreter 275 that converts them to appropriate service calls.

The Mapping Interpreter particularly is the central online component that receives the mapping specification (mapping file) as well as the specifications for the device, service and user preferences. In a main processing loop it receives input events and interprets them according to the mapping. Typically an input event is mapped to a service operation. If the operation has parameters, the interpreter presents a dialog to the user, through which the arguments are specified. Upon complete specification, the interpreter triggers invocation of the service operation through a stub (such as a Simple Object Access Protocol (SOAP) stub).

In the embodiment depicted in FIG. 2, during operation, the service calls are invoked through the Service Stub 204 that performs a remote call on a Service Interface 206, which, in turns, invokes the actual service operations in a Service Implementation layer 208. Any invocation results returned from the service call(s) are passed back from the Stub 204 to the Mapping Interpreter 275, and communicated to the mobile device's Output module 211 for conveyance to the user. This module may additionally address confirmation of service invocations by providing an indication of success or failure (e.g., such as beeping to indicate success). The Mapping Interpreter 275 may also be responsible for conveying the mapping to the user via a Legend (as in map legend), which is dynamically created and managed according to the state of the mobile device, e.g., state based on the interaction context. It is understood that the generic behavior of the mapping interpreter, as described herein above, holds for the different mapping strategies.

In one aspect, a pervasive digital device whether it be a mobile, laptop computer, PDA, cell/mobile phone, Mp3 player, often accommodates several different forms of interaction, such as with a mouse and with a keyboard, through a GUI, a touch-sensitive device, a touch screen or like interface, pad, jog-wheel, button, or through a text-based interface, such as a keypad. The Mapping Generator 250 receives as an input parameter an indicator of which mapping strategy to employ. Several possible mapping strategies are now provided as follows:

Geometric/ergonometric key-based mapping: the Mapping Generator 250 receives or detects proximity and ergonomic information pertaining to the device and maps related actions to nearby keys, and frequently used actions to ergonomically accessible keys or multiple keys. Mnemonic ("verbal"): the Mapping Generator 250 receives or detects actions and maps them to suggestive keys based on their names (e.g., action "play" to the key 'P' or the two-letter sequence ('P','L').

Menu-based mapping: the Mapping Generator 250 receives or detects the set of service actions and maps them to a customized hierarchical menu.

GUI rendering: alternately or in addition, the Mapping Generator 250 may cause the rendering of a custom widget-based graphical user interface for the mobile device.

Gesture capture: for mobile devices with touch-screen or haptic interfaces, user gestures may be captured (i.e., stroke patterns) to invoke actions. For example, an upward stroke may indicate "volume up".

Voice: for mobile devices with voice processing capabilities, the Mapping Generator 250 may enable the creation of a voice-based interface for action invocation.

Even though the Mapping Strategy is shown as a separate input to the Mapping Generator, the mapping strategy may be derived by inspecting the user preferences, device and service descriptions. For example, the user may indicate a preference for mnemonic interfaces, the device may be best suited for a voice interface, or the combination of a service with few operations and a touch-screen device may indicate that a gesture-based interface is advantageous. It is understood that mixed strategies may be employed, e.g., using gestures for a select few actions and other types of mappings for other actions.

Different strategies pose different requirements on the device and service descriptions, as well as user preferences. For example, the geometric strategy requires description of the layout of inputs as well as service metadata pertaining to groupings of actions and action frequency; the mnemonic strategy requires names (descriptions) of all the service actions, as well as key label descriptions.

The I/O mapping functions provided by the Mapping Generator generates a custom user interface based on mobile device capabilities, service requirements, and user preferences. Thus, specifications of these elements are devised that capture the information needed to create the appropriate interface for that device. These specifications, in one embodiment, are all represented in XML and/or XML related and derivative standards. Among the advantages of using this standard format are to enable uniform treatment (parsing, etc.) within the software code, the ability to inspect, edit and manipulate the specifications with standard viewers, editors and tools, extensibility, and compatibility with various service-oriented architectures.

Device Description

There is now described one example of an XML format that may be used by device vendors to fully describe the input capabilities of the device including, but not limited to, aspects such as: the types of the input controls available on the device (push buttons, toggle switches, rotary dials, joy sticks, etc); the precise positions and dimensions of these controls on the device; the normal mapping of these controls to native operations supported on the mobile device, etc. Optionally, the device description may include a detailed three-dimensional model of the device itself specified in a standard 3D modeling language.

In formalizing a device specification, sufficient information is provided to address the following: 1) creating a tailored interface for the mobile device; 2) making it extensible, to accommodate a broad range of current and future devices; 3) making it useful for other applications, such as device emulation. Data structures exemplifying one non-limiting example of the XML device description format is shown in the code sample provided in FIG. 4.

To support a clean separation between the device's logical and physical aspects the specification is structured using a model-view-controller (MVC) pattern, where the model describes the physical elements, the view describes their geometry, and the controller their behavior.

Figure 4:

As shown in FIG. 4 depicting an example XML sample code device description format 400, each section in the XML document is a group. The groups are defined according to: node group (model) 410, layout group (view) 420, and, report group (controller) 430. The node group 410 contains nodes, each corresponding to an I/O control (such as a keyboard key, a switch, an LED indicator, and so on). Each node has a unique ID, and one or more node-values, where a node-value may have a certain context. For example, a keyboard key has a node-value in the default state and another node-value in the "shift" context, where the "shift" context corresponds to a node-value of the <shift> key. The layout group 420 contains one or more grids, where a grid has physical measurements for top-left and bottom-right coordinates and row spacing, and a list of rows. Each row has physical measurements for node size and spacing, and a list of nodes, which are references to the model. A row also has alignment information, and may contain duplications and "empty nodes" to account for larger elements and irregular layout. For example, a space-bar in a keyboard grid would be listed several times in its containing row. In one embodiment, grids are used for representing the geometry of device I/O elements because they commonly appear in practice, and provide a natural spatial means of grouping elements. Additionally, grids are versatile—an isolated element can be represented as a 1×1 grid. Additional layouts besides grids (such as a circular arrangement of keys) are also defined. The report group 430 lists the possible types of I/O events associated with the I/O controls. For example, the report group may include one or more endpoints, each of which has a direction ("input" or "output"). An endpoint contains an endpoint report, which contains a list of report values. Each report value refers to a node value (from the Model) and has a value, which represents the event. For example, the node value reference is to the second "x" key value (in the "shift" context), and the event value is "X".

In addition, an abstract description of the device may be provided that includes, but is not limited to, device dimensions, a description of the device's layout, shape and size of input controls and size of output controls (when the output control includes a display), hardware capabilities such as processor type and speed, and system information, power consumption, software capabilities including software version. Descriptions can include the number and location of input controls, the type and size of the input controls (sliders, sticks, dials, knobs, etc.), their geometric shape, texture and material (plastic/titanium, etc), whether they can be lit or not (visible at night), etc. Other elements include output capabilities, display size, brightness resolutions.

The specification is geared towards capturing information useful for I/O mapping. It provides information at a usable level of abstraction (e.g., grids rather than individual node locations), and need not contain properties that are not used by the mapping generator. The format is sufficiently flexible to add other characteristics as needed.

User Preferences

In contrast to the device description, user preferences are unstructured due to their wide scope. The preferences can relate a preferred mapping strategy, and different strategies accommodate different preferences. A flexible property-value format is thus employed that supports arbitrary preferences and categories of preferences. In this format, the XML document contains a list of <Category> elements, where a category has a name (e.g., <Category name="Accessibility">), and each category contains a list of <Property> elements, where a property has a name, value and type (e.g., <Property name="Color Blindness" value="false" type=."Boolean">). For example, a preference indicating limited dexterity may be used to only use a sparse subset of the keys for a device with a densely-packed keypad, whereas a preference indicating color blindness could be used to avoid relying on colors in a visual interface on the device.

User preferences further may include both high level and low level preferences. Some high level preferences include a user's physical dimensions, age, gender of user, a user's weight, a user's physical location, a user's manual dexterity level, a user's color perception or hearing acuity, a user's preferred handedness, language preference, preference for large keys (i.e. key size, shape, color, texture), preference for keys in the center, certain groupings of keys, preferring some groups of functions being mapped on to specific keys, preference of rotary knobs over small keys, modality of interface (voice over soft onscreen keys) or other modalities preferred by user (e.g., audio, touch, text, video, smell). Low-level preferences may include colors, font, size or rendered graphics (such as text, icons, etc.).

In desktop applications, preferences are typically exposed by the application GUI, and can be modified by the user at runtime. In I/O Mapping user preferences are exposed at interface generation time for several reasons. First, in a dynamic environment users may not want to be bothered by setting preferences at runtime, especially through a small mobile device. Second, the user preferences may be used across many services from multiple providers (e.g., being left-handed).

Service Description

A Web Services description and associated standards are implemented as the basis for characterizing services. The approach to formalizing the service specification starts with WSDL (Web Services Definition Language standard Version 2.0), which is an XML-based language that provides a model for describing Web services. The service description includes information that can be found in the WSDL such as the operations, input parameter types, names, descriptions of the service, etc. The WSDL base service specification may then be enhanced with information related to the expected use of the service. Several enhancements identified are: the grouping of the operations (which operations belong together?); the Frequency of operations: (which operations are used more frequently than others?); and, Importance of operations: (which operations are more important than others?); the operation hierarchy, the probability distributions of operations and also conditional probabilities of operations, e.g., given that a function A was performed last, the probability of function B being performed now is X.

Note that important operations may not be frequent. For example, power on/off is important, but may not be frequently used. Additional pertinent aspects of the service description, which are already part of the existing standards, are human-readable labels for operations and parameters, which are part of the WSDL standard, and parameter types (such as string, integer) and restrictions (such as enumerations or numeric ranges), which are part of the XML Schema (XSD) type system commonly used with WSDL.

The above enhancements are relevant for the various mapping strategies. As mentioned, there are many types of mapping strategies; e.g., mnemonic mappings, GUI mappings, and menu-based mapping strategies. In a mnemonic mapping, for example, a first mnemonic can be used to access the group, followed by a mnemonic for the operation, and frequency or importance can be employed in choosing how to allocate operation mnemonics. In a GUI mapping this information can be used for deciding how to organize and assign display real estate. In the menu-based mapping strategy, operation grouping can be used to ascertain the menu structure, frequency can help organize the operations within a menu, and importance could be used for emphasizing certain operations.

Gesture capture is very visual in nature, and may require additional hints in the service description. This challenge is part of future exploration. That said, the current information could be useful even in this case, such as assigning "easy" gestures to more common operations.

Figure 3:
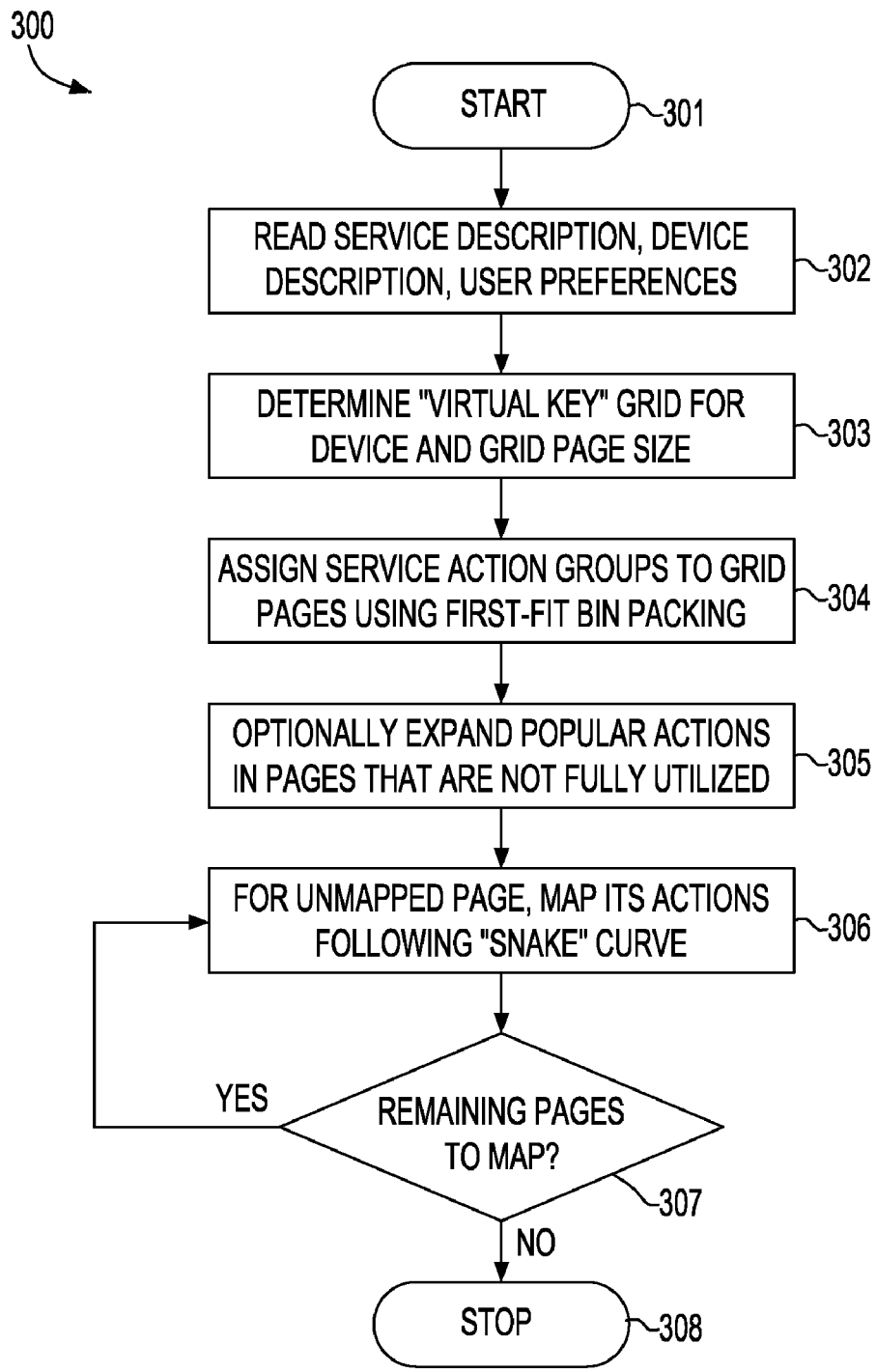
FIG. 3 is a flow chart depicting one example methodology 300 of the invention; and, FIG. 4 depicts an example code sample 400 including data structures exemplifying one non-limiting example of the XML device description format according to one aspect of the invention.

FIG. 3 is a flow chart depicting a methodology 300 of the invention in one embodiment for a key-based mapping of service operations. FIG. 3 particularly shows an algorithm employed by the mapping generator (260 in FIG. 2). When a service mapping needs to be computed (at step 301), e.g., when a service is invoked at a service zone, the mapping generator reads in the service description, device description and user preferences (at step 302). For the algorithm described in the example embodiment, the information of interest is: action grouping and popularity (in the service description), precise description of the geometry of keys, assumed to form a grid (in the device description), and the user's preference for button separation and whether to single actions mapped to multiple keys (in the user preferences). The triad of user preferences, device description, and description of the service actions are then examined by the mapping function to create a mapping that optimizes the placement of the services' actions (interfaces) on to the device's input controls while taking the user preferences into account. In step 303, the virtual key grid of the device is determined, whereby the user's preference for minimum key separation is taken into account with respect to the physical separation of keys on the device. For example, if the separation desired by the user is about 2.0 cm and the distance between key centers is 1.5 cm, then every other key is used. Both horizontal and vertical distances are taken into account. As a result of this step, the grid page size, which is the largest number of actions that can be mapped to keys, is determined. The entire collection of service actions thus needs to be split into virtual pages, where each page can accommodate a number of actions that is at most the grid page size. According to the service description, actions are grouped, and the algorithm tries to keep groups on the same virtual page. Therefore, a first-fit bin packing technique or like combinatorial technique, is employed to partition action groups into as small as possible number of virtual pages (step 304). Once action sets are assigned to virtual pages, some pages may have less actions assigned to them than they can accommodate, so the algorithm may expand popular action to be assigned multiple keys (step 305). This expansion is contingent upon the user's preference for having single actions mapped to multiple keys. Next, actions assigned to a virtual page are mapped to specific virtual keys on that page (step 306). To maintain proximity of grouped actions, the assignment is performed along a "snake" curve that traverses the grid rows (or columns) in a zigzag fashion. This step is repeated as long as there are pages remaining to be mapped (step 307).

While keys are assumed to form a grid, non-uniform placements of keys are within the broad scope of the invention. In some cases, a large key could be treated as a collection of smaller keys with the additional constraint that only one of the keys from the collection is functional.

As users continue to use a particular mobile device for some time, they become familiar with the placement and the operation of the input controls and the locations on touch screens based on tactile landmarks on their mobile devices. Thus, the present invention permits the user to leverage this acquired familiarity on the part of the users to give them easier access to services and control of devices in their environment In a related aspect, the present invention enables communications providing users with the ability to control devices and useful appliances in the home such as televisions, radios, music or movie players, lights, coffee makers, microwave ovens, etc., using one's favorite mobile device such as a cell phone, PDA or portable media player. Additionally, capability is provided that enables the same mobile device to also be used to interact with virtual services related to one's environment, such as discovering vegetarian restaurants in a shopping mall.

While it is possible for a developer to create specific instances of such remote access and control applications by specifically programming both the mobile device side as well as the target service, the invention provides a technology that will enable such associations to be created automatically without any custom programming.

As mentioned, the present invention implements a service-oriented architecture that delivers services to mobile devices in public spaces, denoted service zones, which may include stationary devices. Examples of such zones include, but are not limited to, transportation hubs such as train/bus stations, ferry terminals and airports; retail stores and malls, movie theaters, sports arenas, and public transportation vehicles and aircraft where people may spend large amounts of time. Each zone may offer several services that are relevant for the zone, such as viewing-services on large local displays, document printing services, product reviews, availability, and prices of items available in the area, local restaurant listings, transport schedules, etc. In one embodiment, these services offered are classified by ontologies. By providing only services relevant to the zone instead of drowning the user with a compendium of services, the task of finding and using them becomes simpler. In addition, the present invention further takes into account the user's dynamic preferences to her customize the presented list of services.

The service zones may comprise public areas equipped with wireless access points for technologies, such as Bluetooth or 802.11, and with environmental devices, such as displays, projectors, and printers. Bus and train stations, airport terminals, doctor/dentist waiting rooms are the most common examples of service zones. Buses, trains, and airplanes themselves may also be zones, provided they are equipped with the necessary environmental devices.

In one aspect, different service zones are configured differently, in both stationary devices and services offered. The diversity of the zones and the devices suggests the advantageous use of late binding of service interface to mobile devices in the manner as described.

As mentioned herein, in one implementation, the Web Services Description Language (WSDL) 2.0 is used that provides an XML format for describing network services as a set of endpoints operating on messages containing either document-oriented or procedure-oriented information. Messages represent an abstract definition of the data being transmitted and comprise logical parts, each of which is associated with a definition within some type system. Messages exchanged are described by data type definitions provided by types.

The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate, however, with the use of bindings according to a standard that describes how to use WSDL in conjunction with SOAP 1.1, HTTP GET/POST, and MIME, for example. Bindings specify a concrete protocol and data format specifications for the operations and messages defined by a particular port type. A port type describes a set of abstract operations with each operation referring to an input message and output message.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for configuring a mobile device for use in interacting with a service, said method comprising:
   communicating a description of said device including one or more input control devices including one or more of: dial, knob, key, slider, bezel, switch and jog wheel devices, said device description including size, position and spacing of the input control devices;
   communicating user preferences for operating the device, said preferences including one or more of: input control device size, position and spacing and preference to map actions to a particular input control device or to a group of input control devices; and,
   communicating a description of a service including any aspects of the service functionality,
   receiving, by a mapping function, said user preferences, device description, and service functions and analyzing said user preferences, device description, and service functions to create a customized mapping strategy that optimizes the placement of the service's functions on to the device's input controls while taking the user preferences into account; and,
   automatically configuring said input controls of the mobile device based on said mapping strategy when said service is invoked, wherein said user's preference for input control size, position and spacing is taken into account with respect to a physical realization of input controls on the device,
   wherein a description of a service includes one or more of: a service operation, and a service name, a service description being optionally enhanced with information related to the expected use of the service, said expected use comprising one or more of: a grouping of the service operations, a frequency of service operations, an importance of service operations, a service operation hierarchy, a probability distribution of one or more operations and/or conditional probabilities of operations.

2. The method as claimed in claim 1, wherein a user preference includes one or more of: a user's physical dimensions, a user's physical location, a user's preferred handedness, a user's manual dexterity level, age, weight, gender of user, visual acuity, color perception, hearing ability; and, said device description further includes one or more of: a description of said device's output controls, device dimensions, power consumption, day/night visibility of said device input/output controls, and, a 3D geometric description of said device.

* * * * *